(12) United States Patent
Hummel

(10) Patent No.: US 9,747,679 B2
(45) Date of Patent: Aug. 29, 2017

(54) METHOD FOR MEASURING THE DEFLECTION OF A FUEL ELEMENT CAN FOR A FUEL ELEMENT OF A BOILING WATER REACTOR

(71) Applicant: AREVA GmbH, Erlangen (DE)

(72) Inventor: Wolfgang Hummel, Neumarkt (DE)

(73) Assignee: AREVA GMBH, Erlangen (DE)

( * ) Notice: Subject to any disclaimer, the term of this patent is extended or adjusted under 35 U.S.C. 154(b) by 21 days.

(21) Appl. No.: 14/419,461

(22) PCT Filed: Aug. 8, 2013

(86) PCT No.: PCT/EP2013/066603
§ 371 (c)(1),
(2) Date: Feb. 3, 2015

(87) PCT Pub. No.: WO2014/029625
PCT Pub. Date: Feb. 27, 2014

(65) Prior Publication Data
US 2015/0193922 A1    Jul. 9, 2015

(30) Foreign Application Priority Data

Aug. 20, 2012  (DE) .................. 10 2012 214 730
May 24, 2013  (DE) .................. 10 2013 105 365

(51) Int. Cl.
*G06T 7/00*    (2017.01)
*G01B 11/245*    (2006.01)

(52) U.S. Cl.
CPC .......... *G06T 7/0004* (2013.01); *G01B 11/245* (2013.01); *G06T 2207/10004* (2013.01)

(58) Field of Classification Search
CPC ........ G06T 7/0004; G06T 2207/10004; G01B 11/245
USPC ............................................................ 348/82
See application file for complete search history.

(56) References Cited

U.S. PATENT DOCUMENTS

| 4,766,374 A | 8/1988 | Glass, III et al. |
| 6,549,600 B1 | 4/2003 | Beier et al. |
| 2011/0182393 A1* | 7/2011 | Hequet .................. G21C 17/06 376/248 |

FOREIGN PATENT DOCUMENTS

| DE | 37 38 663 A1 | 5/1988 | |
| ES | FR 2721704 A1 * | 12/1995 | ........... G01B 11/022 |
| FR | 2 754 892 A1 | 4/1998 | |
| FR | 2754892 A1 * | 4/1998 | ........... G01B 11/245 |

OTHER PUBLICATIONS

International Application No. PCT/EP13/66603 International Preliminary Report on Patentability Dated Feb. 26, 2015 (6 Pages).

* cited by examiner

*Primary Examiner* — Jamie Atala
*Assistant Examiner* — Ayman Abaza
(74) *Attorney, Agent, or Firm* — Keller Jolley Preece

(57) ABSTRACT

A method for measuring the deflection of a fuel element can for a fuel element of a boiling water reactor involves taking an image of the fuel element can with a camera and evaluating the image using photogrammetry. By means of the method, it is possible to determine the deflection of a fuel element can by taking a single image, even in the absence of external structural features recognizable in the image, and without knowledge of the relative position between the camera and the fuel element can.

6 Claims, 2 Drawing Sheets

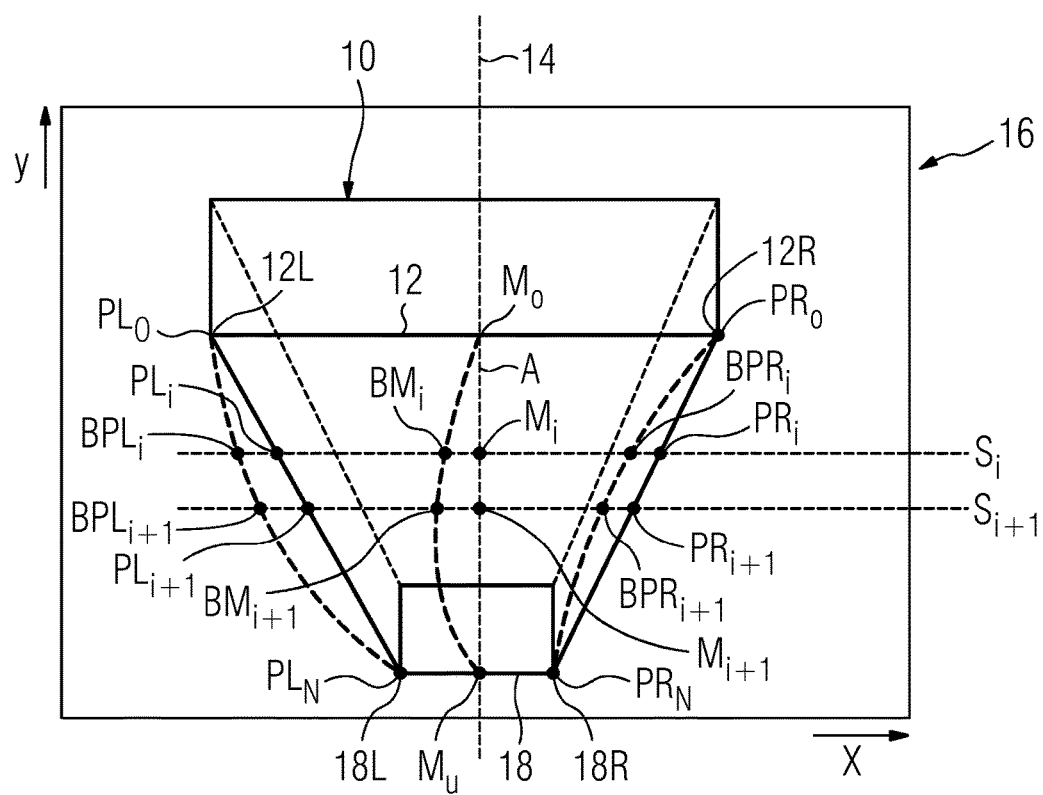

METHOD FOR MEASURING THE DEFLECTION OF A FUEL ELEMENT CAN FOR A FUEL ELEMENT OF A BOILING WATER REACTOR

CROSS-REFERENCE TO RELATED APPLICATIONS

This application is a national phase entry under 35 U.S.C. §371 of International Application No. PCT/EP2013/066603, filed Aug. 8, 2013, which claims the benefit of German Application Nos. 10 2013 105 365.3, filed May 24, 2013 and 10 2012 214 730.6, filed Aug. 20, 2012. The entire contents of each of the foregoing patent applications are hereby incorporated by reference.

BACKGROUND OF THE INVENTION

1. Field of the Invention

The invention relates to a method for measuring the deflection of a fuel element can of a fuel element of a boiling water reactor.

2. Background and Relevant Art

In a fuel element of a boiling water reactor, the fuel rods are arranged within a fuel element can. In the course of their operation, depending on their position in the core, the fuel elements and, accordingly, the fuel element cans can experience a deflection which, in the worst possible case, can lead to sluggishness of the control elements or to problems during a fuel element change. In order to be able to assess whether, where and with which rotational orientation a fuel element or a fuel element can may continue to be used in the core, it is therefore necessary to determine the deflection of the fuel element cans.

BRIEF SUMMARY OF THE INVENTION

The invention is therefore based on the object of specifying a method for measuring the deflection of a fuel element can of a fuel element of a boiling water reactor which can be carried out simply and with little expenditure of time.

The stated object is achieved, according to the invention, by a method having the features of patent claim 1. In the method for measuring the deflection of a fuel element can of a fuel element of a boiling water reactor, an image of the fuel element can is recorded with a camera and is evaluated photogrammetrically, comprising the following method steps:

a) the fuel element can is positioned in a flooded basin, b) the camera is positioned above the fuel element can and offset laterally with respect to the fuel element can in such a way that b1) its optical axis is oriented at an acute angle to an ideal central longitudinal axis of the fuel element can, and that b2) its image plane is oriented parallel to a front edge of the fuel element can, and that b3) both of the front edges of the fuel element can that face the camera are depicted in the image, c) in the image recorded by the camera, the image positions of the corner points of the front edges oriented parallel to the image plane and facing the camera are measured, d) from a known length and width of the fuel element can, the image positions of the corner points of the front edges and the known image width of the camera, either the position of a section line in the image in which an intermediate plane perpendicular to the ideal central longitudinal axis and predefined with respect to its axial position intersects the side surface of the fuel element can that faces the camera is calculated, or the axial position of this section line is calculated from the position of a predefined section line in the image, e) the section line is inserted into the image and the image positions of the corner points of the fuel element can that are located on this section line are measured, f) from the image positions of the corner points, the image position of the center of a line connecting the corner points and running parallel to the front edges is determined, g) with the aid of the known width of the fuel element can and of the known imaging scale of the camera in this section line, by using the measured image position of this center, the deviation of the latter from the ideal central longitudinal axis is calculated.

By means of this procedure, it is possible to measure the whole of the fuel element can, of which the length (distance between two corner points located on the front ends of a longitudinal edge) and width are known, by recording a single image, without the lateral and vertical distance of the camera from the fuel element can and the angle between the ideal central longitudinal axis of the fuel element and the optical axis of the camera having to be known for this purpose.

In the following, the term "ideal central longitudinal axis" is to be understood to mean a straight connecting line which connects the centers of the front edges (upper and lower) of the fuel element can that are located on the same side wall.

Image width of the camera designates the distance between the center of an imaginary thin lens and the image plane which has the same imaging scale as that used in the, generally multi-lens, camera objective, account additionally being taken of the different refractive indices of the medium located within the camera housing (usually air) and of the water surrounding the camera.

Although, in principle, it is already known from US 2011/0182393 A1 to measure the deflection and torsion of a fuel element of a pressurized water reactor with a photogrammetric method, the method explained therein is not suitable for measuring the deflection of a fuel element can, since the latter contains no structural elements visible from outside to which an exact axial position can be assigned. The method known from this document allows for an assignment of the deviations of the position of a structural element in the area of a spacer that are respectively measured in the image from an ideal straight line extending in the longitudinal direction of the fuel element solely by means of the position of the spacer that is visible in the image. In the case of a fuel element of which the fuel rods are surrounded by a fuel element can, or in the case of a fuel element can that is not filled, the horizontal planes respectively chosen for the measurement of the deviation cannot readily be assigned to an actual axial position.

The invention is based on the idea that, even without the presence of structural elements of which the axial position is known and which can be segmented in the image, and without exact knowledge of the relative position between camera and box-shaped fuel element can, it is possible, with the aid of simple basic equations of geometric optics, merely by using the known length and width of the fuel element can, the image positions of the corner points of the front edges and, accordingly, the image width of the front edges and the known image width of the camera in relation to each section line or section plane extending at right angles to the ideal central longitudinal axis, by measuring the width of the imaged fuel element can of the side surface facing the camera in this section plane, to determine the axial position thereof. To this end, either a calculation is made of the position of a section line in the image in which an intermediate plane which is perpendicular to the ideal central longitudinal axis, of which the axial position is predefined and which intersects the flat side of the fuel element can that faces the camera, or, by using the position of a predefined section line in the image, its actual axial position is calculated. Accordingly, from the positions of the corner points in the image that lie on this section line, it is possible to determine in which axial position which deviation of the real central longitudinal axis from the ideal central longitudinal axis is present.

In order to obtain the most complete statement about the course of the deflection of the fuel element can over the entire length of the fuel element can, the image position of the center is preferably measured for a multiplicity of intermediate planes, and the course of a center line connecting the centers and the deviation of said center line from the ideal central longitudinal axis is calculated.

On the one hand, measurement of the fuel element can is possible when the latter is empty, i.e. after the retaining structure fixing the fuel rods has been removed therefrom. On the other hand, the fuel element can may also be measured on the complete fuel element. In the latter case, a particularly simple procedure is achieved when the fuel element is positioned hanging freely in the basin during the performance of the method, since in this case it does not have to be uncoupled from the loading machine used to transport the fuel element into the measuring station.

BRIEF DESCRIPTION OF THE DRAWINGS

In order to explain the invention further, reference is made to the exemplary embodiment illustrated in the figures, in which:

FIG. 3 shows an image of the fuel element can recorded by the camera, likewise in a simplified illustration.

DETAILED DESCRIPTION

Figure 1:
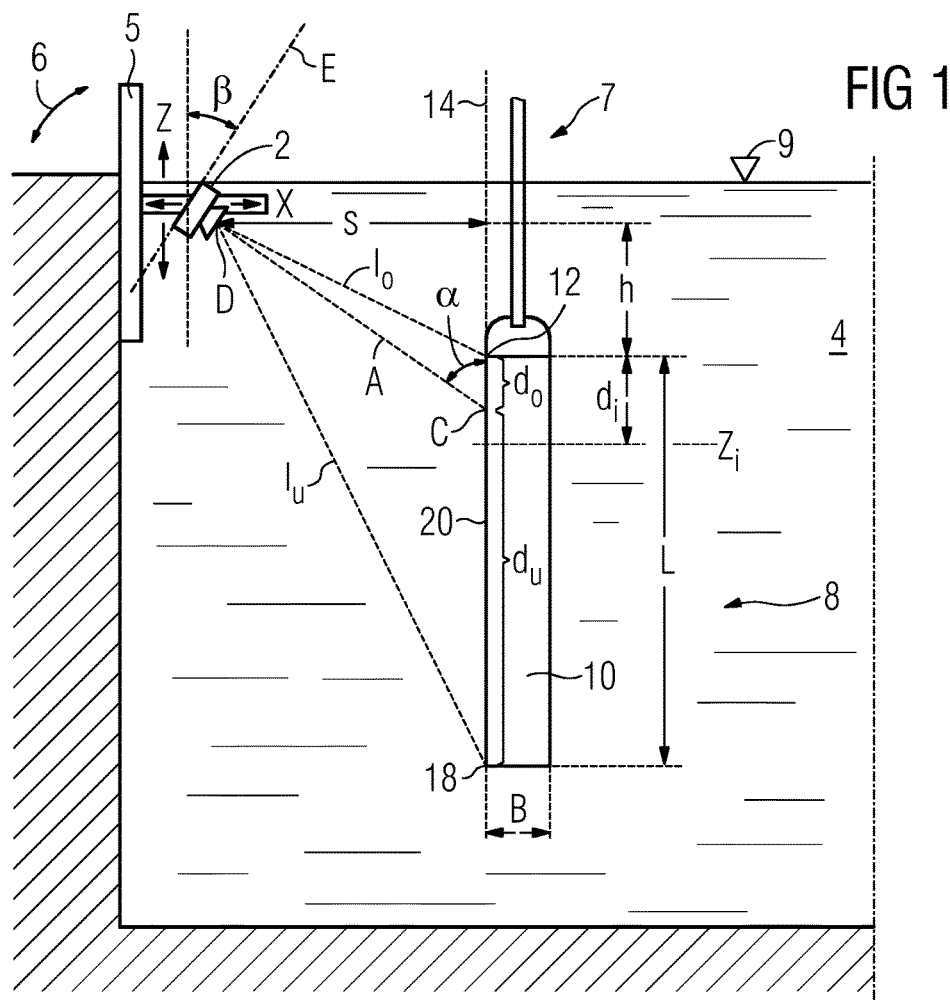
FIG. 1 shows a schematic image, in which the arrangement of the camera and the fuel element during the performance of the photogrammetric measurement according to the invention is illustrated in a side view.

According to FIG. 1, a camera 2 provided for the photogrammetric measurement of the fuel element can is mounted such that it can be displaced horizontally (x-axis) and vertically (z-axis) on a frame 5 arranged on the edge of a flooded basin 4 and such that it can be pivoted about an axis extending at right angles to the drawing plane and at right angles to the x and z axis, as illustrated by a double arrow 6. The image plane E of the camera 2 extends at right angles to the drawing plane, so that the angle β between the z axis and image plane E can be changed in the (drawing) plane spanned by the y and z axis.

A fuel element 8 of a boiling water nuclear reactor hanging freely from the gripper of a fuel element loading machine 7 is positioned in the image field of the camera 2, the fuel element being illustrated in simplified form in the figure only in the shape of the fuel element can 10 surrounding the fuel rods. The basin 4 is flooded, so that camera 2 and fuel element 8 are located under the water surface 9.

The camera 2 is located at a distance s and a height h offset laterally with respect to or above the upper front edge 12 of the fuel element 8 or fuel element can 10 that faces the camera 2. In this case, the statements about distance and height refer to the point at which the optical axis A of the camera 2 intersects the outer surface of the objective lens system. Camera 2 and fuel element 8 or fuel element can 10 are positioned relative to each other in such a way that the optical axis A of the camera 2 extends at an acute angle α to an ideal central longitudinal axis 14 of the fuel element 8. In other words: the camera 2 is offset laterally with respect to the fuel element can, i.e. arranged at a distance from the central longitudinal axis 14. The fuel element 8 or the fuel element can 10 is aligned in such a way that the image plane E of the camera 2 is oriented parallel to the front edge 12 of the fuel element can 10. The fuel element 8 is preferably additionally positioned such that the corner points of the front edge 12 in the image are approximately at the same distance from the lateral image edge, so that an ideal central longitudinal axis 14 connecting the image positions of the centers of the upper front edge 12 and the lower front edge 18 extends through the center of the image. Camera 2 and fuel element 8 are additionally positioned relative to each other such that, in the image recorded by the camera 2, both the upper and the lower front edge 12 and 18 are depicted.

From the known image width of the camera 2 and the known length L and width B of the fuel element can 10, it is now possible to determine a deflection of the fuel element in a plane perpendicular to the drawing plane solely from the course of the lateral longitudinal edges 20 of the fuel element can 10 that face the camera 2, by applying simple trigonometric formulas and without any knowledge of the angle β, of the lateral distance s or of the vertical spacing h.

The optical axis A of the camera 2 intersects the plane spanned by the front edges 12, 18 and oriented at right angles to the drawing plane, which also coincides sufficiently accurately with the side surface of the fuel element can 10 that faces the camera 2, in the case of a rearward curved fuel element can (to the right in FIG. 1), at a point C. The latter is located at a distance $d_o$ and $d_u$ from the front edges 12 and 18, respectively. $l_o$ and $l_u$ designate the distances of the front edges 12 and 18 from a point D at which the optical axis A intersects the center of the objective lens of the camera 2, considered simply as a thin lens.

Also drawn in FIG. 1 is a section plane $Z_i$ which extends at right angles to the central longitudinal axis and to the drawing plane and which is located at a distance $d_i$ from the upper front edge of the fuel element can 10.

Figure 2:
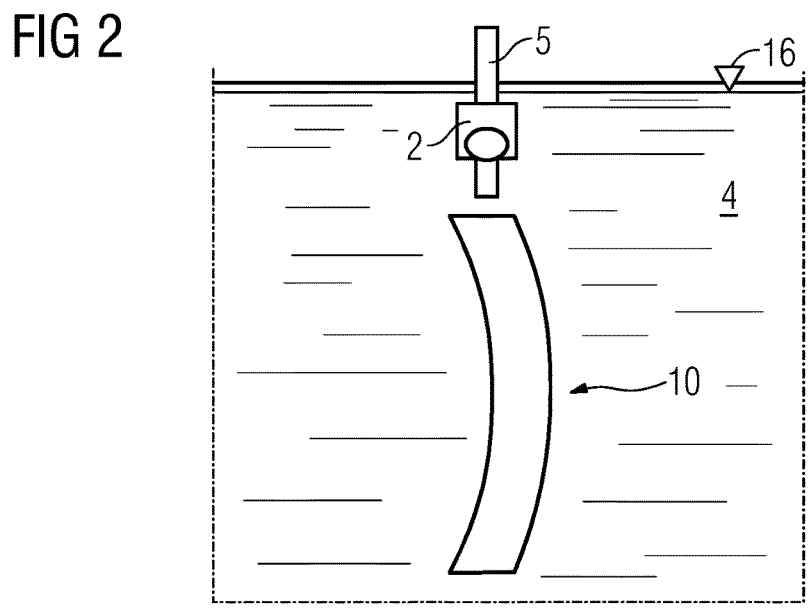
FIG. 2 shows a plan view of the rear side of a deflected fuel element, facing away from the camera, likewise in a schematic basic image.

FIG. 2 shows the arrangement illustrated in FIG. 1 in a plan view of the rear side of the fuel element can 10, facing away from the camera 2, the gripper of the fuel element loading machine not being illustrated for reasons of clarity. Likewise, the lateral deflection of the fuel element can 10 is illustrated exaggerated.

By using FIG. 3, the procedure during the measurement of the deflection will be explained in more detail. In the image field 16 of the camera, the fuel element can 10 is depicted perspectively, it being possible to see that both the upper front edge 12 and the lower front edge 18 extend parallel to the x axis of an xy coordinate system spanned by the image field 16 of the camera. As a result of the acute-angled oblique orientation of the optical axis A of the camera relative to the ideal central longitudinal axis 14, the lower front edge 18 is significantly shorter than the upper front edge 12. Moreover, camera and fuel element can 10 are aligned in such a way that the image center, i.e. the point at which the optical axis A intersects the image plane, is located on the ideal central longitudinal axis 14. This central longitudinal axis is defined in the image by the connecting line between the centers $M_o$, $M_u$ of the imaged front edges 12, 18.

By using the known dimensions L, B of the fuel element can 10, the known image width b of the camera, the image positions $PL_0$, $PR_0$, $PL_N$, $PR_N$ of the front corner points 12R, 12L, 18R, 18L are used to calculate the distances $d_o$, $d_u$ and the distances $l_o$, $l_u$ (FIG. 1), so that the position and alignment of the camera relative to the fuel element can 10 and, accordingly, the geometric imaging relationships are known. From the image coordinates of each image point on the side surface of the fuel element can 10 that faces the camera, it is then possible to calculate the position of the object point associated with this image point in the plane spanned by the side surface of the fuel element can 10 that faces the camera.

In a next step, a plurality of intermediate planes $Z_i$ on the real fuel element can, of which the distance $d_i$ (FIG. 1) from the upper front edge 12 is known in each case, are then selected. With the aid of the imaging properties of the camera, which are now known, for these selected intermediate planes $Z_i$ section lines $S_i$ which would result if the intermediate planes $Z_i$ were to intersect a side surface of the fuel element can 10 that would be flat toward the camera are then displayed in the image recorded from the fuel element can 10. Then, the image positions $PL_i$ and $PR_i$ of the corner points at which the section line $S_i$ in the image intersects the imaged longitudinal edges of the fuel element can 10 are measured. Even in the case of a fuel element can 10 that is curved convexly or concavely, seen from the camera, said image positions coincide with sufficient accuracy with the image positions of the corner points that are actually located in these intermediate planes $Z_i$.

This is carried out for a plurality of intermediate planes $Z_i$ and section lines $S_i$, only one further intermediate plane $Z_{i+1}$ and the associated image positions $PL_{i+1}$ and $PR_{i+1}$ of the corner points being inserted into the figure for reasons of clarity. The image position $M_i$ of the center located between the image positions $PL_i$ and $PR_i$ of the corner points are then calculated for each intermediate plane $Z_i$. In the case of a fuel element can 10 that has not been deflected, these centers all lie on the ideal central longitudinal axis 14.

As an alternative to the procedure outlined above, it is also possible firstly for a section line $S_i$ extending parallel to the front edges 12, 18, for which the actual axial position thereof (distance $d_i$) is subsequently determined, to be displayed in the figure. It is important that the actual axial position of the section line $S_i$ is known.

In FIG. 3, the longitudinal edges 20 of a curved fuel element can 10 are now shown dashed. In this case, the image positions $BPL_i$ and $BPR_i$ are displaced to the left. Accordingly, the image position $BM_i$ at the center of the line defined by these corner points $BPL_i$ and $BPR_i$ is also displaced to the left. If this is carried out for a multiplicity of intermediate planes $Z_i$ and section lines $S_i$, it is possible in this way, because of the known imaging relationships, for the course of the real central longitudinal axis 14 to be calculated from the measured image positions $BM_i$, $BM_{i+1}$ of these centers.

The invention claimed is:

1. A method for measuring deflection of a fuel element can for a fuel element of a boiling water reactor, comprising the following method steps:
   a) positioning the fuel element can in a flooded basin,
   b) positioning a camera parallel to a z-axis of the fuel element can at a height above the fuel element can and offset laterally with respect to the fuel element can by:
      b1) orienting the camera's optical axis at an acute angle to an ideal central longitudinal axis of the fuel element can, and
      b2) orienting the camera's image plane parallel to two front edges of the fuel element can extending parallel to an x axis,
   c) capturing a single image of the fuel element can with the camera such that both of the front edges of the fuel element can that face the camera are depicted in the single image, and
   d) evaluating the captured single image via photogrammetry to determine a deflection of the fuel element can by:
      d1) measuring, in the single image recorded by the camera, image positions of corner points of the two front edges of the fuel element can oriented parallel to the image plane and facing the camera,
      d2) calculating, from known length and width of the fuel element can, the measured image positions of the corner points of the the front edges of the fuel element can, and a known image width of the camera, either the position of a section line in the single image in which an intermediate plane perpendicular to an ideal central longitudinal axis and predefined with respect to the intermediate plane's axial position intersects a side surface of the fuel element can that faces the camera, or the axial position of this section line from a position of a predefined section line in the single image,
      d3) inserting the section line into the single image and measuring image positions of border points of the fuel element can that are located on this section line,
      d4) determining, from the measured image positions of the border points, an image position of a center of a line connecting the border points and running parallel to the two front edges, and
      d5) calculating, with the aid of the known width of the fuel element can and of a known imaging scale of the camera in the section line, and by using the determined image position of the center of the line connecting the border points, a deviation of the center from the ideal central longitudinal axis, wherein the deviation of the center from the ideal longitudinal axis represents the deflection of the fuel element can, and
   wherein the deflection of the fuel element can is calculated without reference to any structural elements in the flooded basin other than the fuel element can.

2. The method as claimed in claim 1, further comprising:
measuring the center of the line connecting the border points for a multiplicity of intermediate planes;
determining a course of a center line connecting the measured centers of the lines connecting the border points for the multiplicity of intermediate planes; and
determining the deviation of the center line from the ideal central longitudinal axis, wherein the deviation of the center line from the ideal longitudinal axis represents the deflection of the fuel element can.

3. The method as claimed in claim 1, further comprising positioning the fuel element as hanging freely in the basin in order to measure the deflection of the fuel element can.

4. The method as claimed in claim 2, further comprising positioning the fuel element as hanging freely in the basin in order to measure the deflection of the fuel element can.

5. The method as claimed in claim 1, wherein the deflection of the fuel element can is calculated without using a lateral distance or a vertical distance of the camera from the fuel element can.

6. The method as recited in claim 1, wherein the deflection of the fuel element can is calculated without using the acute angle.

* * * * *